Jan. 28, 1930.                R. MEIJER                1,744,787

DRIVING GEAR OF PUMPING ENGINES

Filed Jan. 13, 1926

Reinier Meijer
INVENTOR

By: Marks & Clerk
Attys

Patented Jan. 28, 1930

1,744,787

UNITED STATES PATENT OFFICE

REINIER MEIJER, OF VOORSCHOTEN, NEAR THE HAGUE, NETHERLANDS, ASSIGNOR OF ONE-HALF TO DE BATAAFSCHE PETROLEUM-MAATSCHAPPIJ, OF THE HAGUE, NETHERLANDS

DRIVING GEAR OF PUMPING ENGINES

Application filed January 13, 1926. Serial No. 81,010.

Figures 1, 2, 3:
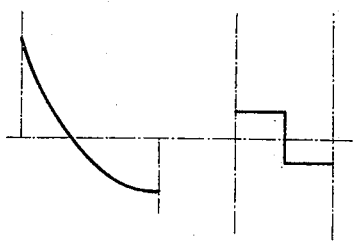

The reciprocatory movement of the piston or the plunger of a pumping engine is usually derived from a shaft revolving at a substantially uniform speed and transmitted through a connecting rod or through a beam. During the first part of each stroke said movement takes place with decreasing acceleration, during the second part with increasing retardation, whereby the piston or the plunger is subjected to accelerating and retarding forces of gradually but widely varying magnitude, said forces attaining their maximum on the dead centers. The magnitudes of said forces can be indicated, as is well known to those skilled in the art, by a curved line as shown in Fig. 1 of the drawing, the ordinates of which represent on a certain scale the accelerations and retardations of the reciprocating masses in every point of their way, represented by the abscissæ. The curvature of this line is merely due to the finite length of the connecting rod. If the length of the connecting rod is infinite, as is realized in the crank slot mechanism, said line is straight and the ordinates at the beginning and at the end of the stroke are equal in length.

The object of my present invention is to improve the driving gear of pumps and it primarily consists in that the magnitudes of the accelerating and retarding forces are reduced at the beginning and at the end of the stroke and increased in the mid-positions of the piston, so that the accelerations and retardations and, consequently, the effects of inertia are more uniform than with ordinary crank mechanism. The—attainable—ideal of a driving gear in accordance with the invention is graphically shown in Fig. 2 having the same character as Fig. 1 but in which the accelerations and retardations are indicated as having constant values. From this figure it also follows, that with such mechanism it is of greater importance than with ordinary crank mechanism, that the moving parts be interconnected without any clearance, since in the middle of the stroke the accelerating force suddenly changes into a retarding force of equal magnitude. This, of course, does not apply to pumping engines with a vertically reciprocating suction and pressure member, the weight of which, less the frictional resistance, exceeds the upwardly directed inertia forces. It is obvious, that the acceleration diagram of such engines consists of two joining parts of a parabola. With the ordinary crank mechanism said diagram is, as is well-known, a sine curve.

As far as its ideal realization is concerned, the invention may be embodied, in the first place, in a driving gear comprising cam discs or like members. Alternatively, the pumping rod with piston or plunger may be suspended from a chain passed over a wheel or disc secured to a shaft, to which the desired movement is imparted through a cable or a chain, the one end of which is passed over a cam disc on said shaft, the other end being fastened to the driving crank. This alternative embodiment is also very suitable for approximating the ideal, in which case the cam disc on the shaft carrying the chain wheel for the pumping rod may be an ordinary eccentric disc.

Figure 4:
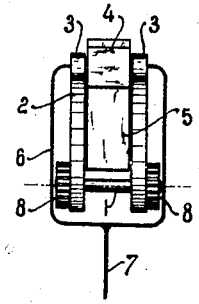

The drawing illustrates diagrammatically and by way of example only some embodiments of the invention, Figs. 3 and 4 showing a front and a side elevational view, respectively, of one embodiment, Figs. 5-8 being front views of four other embodiments.

Referring to Figs. 3 and 4, secured to a shaft 1, which during the pumping operation revolves at a substantially uniform speed, are two equal and parallel cam discs 2. Running over each cam face is a roller 3, both rollers being rotatable about a common axis and mounted to a slide 4, which is adapted to move up and down between ways 5 and associated through a yoke 6 with the pumping rod 7. Shaft 1 is driven through gear wheels 8. The gravity pull of the pumping rod with associate parts tends to keep the rollers 3 in engagement with the cam faces 2. The form of the cams is so that the desired more uniform accelerations and retardations are imparted to the pumping rod 7.

Figure 5:
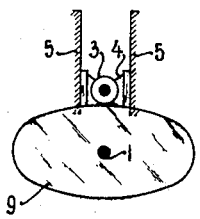

The embodiment illustrated in Fig. 5 is similar to the one shown in Figs. 3 and 4, but here the cam (9) is so formed that the slide 4 with the rollers 3 and, consequently, also the pumping rod (not shown) performs two double strokes for each revolution of shaft 1.

Figure 6:
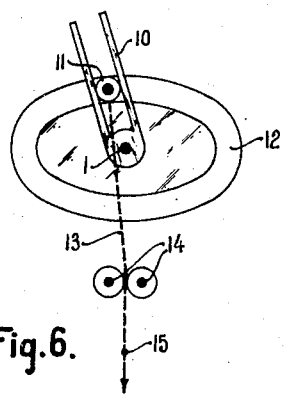

According to Fig. 6, keyed to the shaft 1 is a bifurcated member 10 engaging between its prongs a roller 11 adapted to run in a cam groove 12 of a stationary part. Secured to the shaft of roller 11 and guided by pulleys 14 is a chain 13, to which the pumping rod is attached as at 15. In this case, the pumping rod performs only one double stroke for each revolution of shaft 1.

Figures 7, 8:
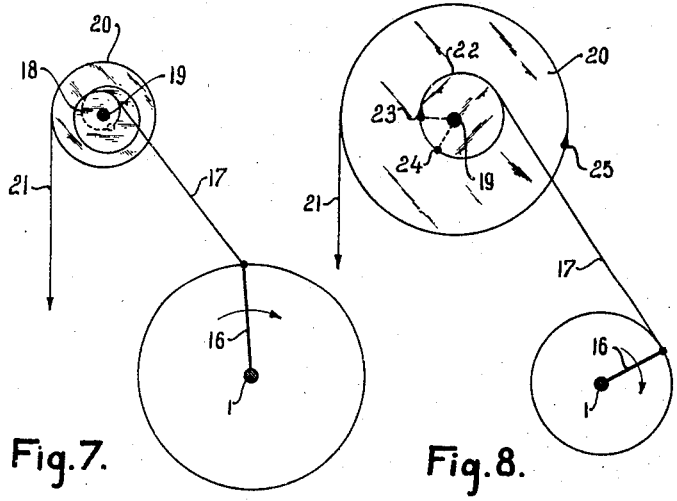

Figures 7 and 8 show two like embodiments, of which the first one attains, the second one only approximates ideal conditions.

The shaft 1 is provided with a crank 16, secured to which is one end of a cable 17, the other end of which is passed over a cam disc 18. The face of this cam is disposed on a helicoidal surface and has a variable distance from the shaft 19, to which the cam is keyed. The length and the form of said cam face are so that the shaft 19 with the cam 20 makes two complete revolutions for each revolution of shaft 1 and during this movement imparts the required uniform accelerations and retardations to the pumping chain 21, which is passed along a helicoidal line around the pulley (or drum) 20. Evidently, dependent upon the form of cam 18, the shaft 19 may be caused to make any desired whole or fractional number of revolutions for each revolution of shaft 1.

In the embodiment according to Fig. 8, the disc 22 on shaft 19 is in the form of an ordinary eccentric. The pumping chain 17, which is secured to said eccentric as at 23, is adapted to be wound on the same until the point 24, so that the portion 23—24 of the eccentric is inoperative and the circumference of the latter may be disposed in a plane. The chain 21 is secured as at 25 to the disc 20, which, as will be understood, here performs only part of a revolution for each complete revolution of shaft 1. This transmission gear may be so dimensioned that the maximum values of the acceleration and the retardation do not exceed about 60% of those with ordinary crank mechanism, the number of strokes per minute and the length of stroke being the same in both cases.

It goes without saying that the shaft 19 may serve to simultaneously drive a plurality of pumps and also, that the pumping rod may, within certain limits, be disposed at any desired distance from and in any position relative to the disc 20 over which its chain 21 is passed.

What I claim is:

1. A driving gear for longstroke deepwell pumps having a reciprocating suction and pressure member the movement of which is derived from a shaft revolving at substantially uniform speed, a crank provided on the shaft, a second shaft, a disc carried on a second shaft, a flexible member connected to the crank and passed over the disc, a second disc on the second shaft, a second flexible member arranged over the second disc for driving the suction and pressure member of the pump, the discs being of such a curvature that the accelerations and retardations of the suction and pressure member at the beginning and at the end of the stroke are reduced and in the middle of the stroke are increased.

2. A driving gear for longstroke deepwell pumps having a reciprocating suction and pressure member the movement of which is derived from a shaft revolving at substantially uniform speed, a crank provided on the shaft, a flexible member connected to the crank, a second shaft, a cam disc on the second shaft over which the flexible member is passed, a drum carried concentrically on the second shaft and the flexible member arranged over the drum for driving the suction and pressure member of the pump so that the accelerations and retardations of the suction and pressure member are substantially constant and change about the middle of the stroke, 3. A driving gear for longstroke deepwell pumps having a reciprocating suction and pressure member the movement of which is derived from a shaft revolving at substantially uniform speed, a crank provided on the shaft, a flexible member connected to the crank, a second shaft, an eccentrically arranged cam disc on the second shaft, the flexible member being passed over and secured to the cam disc, a drum mounted on the second shaft, and another flexible member arranged over and secured to the drum for driving the suction and pressure member of the pump.

In testimony whereof I affix my signature.

REINIER MEIJER.